United States Patent
Tao et al.

(10) Patent No.: US 7,907,508 B2
(45) Date of Patent: **\*Mar. 15, 2011**

(54) GRAPH-BASED METHOD FOR ALLOCATING RESOURCES IN OFDMA NETWORKS

(75) Inventors: Zhifeng Tao, Allston, MA (US);
Yu-Jung Chang, Somerville, MA (US);
Jinyun Zhang, Cambridge, MA (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 411 days.

This patent is subject to a terminal disclaimer.

(21) Appl. No.: 12/112,400

(22) Filed: Apr. 30, 2008

(65) Prior Publication Data
US 2009/0245086 A1     Oct. 1, 2009

Related U.S. Application Data

(60) Provisional application No. 61/039,905, filed on Mar. 27, 2008.

(51) Int. Cl.
*H04J 11/00*    (2006.01)
*H04J 1/00*    (2006.01)
*H04W 40/00*    (2009.01)
*H04W 72/00*    (2009.01)
*H04K 1/10*    (2006.01)
*H04K 1/02*    (2006.01)
*H03D 1/04*    (2006.01)

(52) U.S. Cl. ......... 370/203; 370/281; 370/480; 455/447; 455/450; 375/260; 375/296; 375/346

(58) Field of Classification Search .......... 370/203–204, 370/276–278, 281, 294–295, 310.2, 328–330, 370/331–334, 343–345, 431, 436–437, 478, 480–482; 455/422.1, 446–447, 450, 452.1, 452.2, 101; 375/260, 267, 285, 296, 299, 346–349

See application file for complete search history.

(56) References Cited

U.S. PATENT DOCUMENTS

| 7,069,009 | B2 * | 6/2006 | Li et al. | 455/446 |
|---|---|---|---|---|
| 2002/0028677 | A1 * | 3/2002 | Johnson et al. | 455/446 |
| 2005/0075104 | A1 * | 4/2005 | Jain et al. | 455/423 |
| 2005/0239473 | A1 * | 10/2005 | Pan et al. | 455/453 |
| 2005/0277444 | A1 * | 12/2005 | Rensburg et al. | 455/562.1 |

(Continued)

OTHER PUBLICATIONS

Necker, Marc C., "Towards Frequency Reuse 1 Cellular FDM/TDM Systems", Oct. 2006, pp. 338-346.*

(Continued)

*Primary Examiner* — Aung S Moe
*Assistant Examiner* — Redentor Pasia
(74) *Attorney, Agent, or Firm* — Dirk Brinkman; Gene Vinokur (57) ABSTRACT

A method allocates radio channel resource in an orthogonal frequency-division multiple access network including a set of base stations (BS) and a set of mobile stations (MS). For each BS, a diversity set is maintained for the sets of MS. Each BS determines possible interference at the MS based on the diversity set. A graph is constructed, in which nodes represent the sets of MS, and each edge between a pair of nodes represents channel interference between the MS represented by the pair of nodes. A weight is assigned to each edge, which reflects interference and signal strength on the subchannel between the two MSs connected by the edge. Channel resources are allocated to the MS based on the graph.

14 Claims, 11 Drawing Sheets

U.S. PATENT DOCUMENTS

| | | | |
|---|---|---|---|
| 2006/0154671 A1* | 7/2006 | Kang et al. | 455/450 |
| 2008/0049672 A1* | 2/2008 | Barak et al. | 370/330 |
| 2008/0107035 A1* | 5/2008 | Zhu et al. | 370/241 |
| 2008/0159316 A1* | 7/2008 | Dutta et al. | 370/406 |

OTHER PUBLICATIONS

Jain et al., "Impact of Inteference on Multi-hop Wireless Network Performance", Sep. 2003, ACM 1-58113-753-2/03/0009.*

Marc C Necker - Wayne Clark: "Integrated Scheduling and Interference Coordination in Cellular OFDMA Networks," Broadband Communications, Networks and Systems, 2007. Broadnets 2007. Fourth International Conference on, IEEE, Piscataway, NJ, USA, Sep. 10, 2007, pp. 559-566, XP031276687.

Anand Prabhu Subramanian et al., "Fast Spectrum Allocation in Coordinated Dynamic Spectrum Access Based Cellular Networks" New Frontiers in Dynamic Spectrum Access Networks, 2007. Dyspan 2007. 2nd IEEE International Symposium on, IEEE, PI, Apr. 1, 2007.

* cited by examiner

| | Anchor BS | Adjacent BSs |
|---|---|---|
| MS 1 | 1 | 3 |
| MS 2 | 3 | none |
| MS 3 | 2 | 3 |
| MS 4 | 3 | 1 |
| MS 5 | 2 | 1, 3 |

GRAPH-BASED METHOD FOR ALLOCATING RESOURCES IN OFDMA NETWORKS

RELATED APPLICATION

This U.S. patent application claims priority to U.S. Provisional Patent Application 61/039,905 "Graph-Based Method for Allocating Resources in OFDMA Networks," filed by Tao et al. on Mar. 27, 2008, and incorporated herein by reference.

FIELD OF THE INVENTION

This invention relates generally to allocating radio resources, and more particularly to allocating radio resources in orthogonal frequency-division multiple access (OFDMA) cellular networks.

BACKGROUND OF THE INVENTION

OFDMA

Orthogonal frequency-division multiplexing (OFDM) is a modulation technique used at the physical layer (PHY) of a number of wireless networks, e.g., networks designed according to the well known IEEE 802.11a/g and IEEE 802.16/16e standards. Orthogonal Frequency Division Multiple Access (OFDMA) is a multiple access scheme based on OFDM. In OFDMA, separate sets of orthogonal tones (subchannels or frequencies) and time slots are allocated to multiple transceivers or mobile stations (MS) by a base station (BS) so that the transceivers can communicate concurrently. OFDMA is widely adopted in many next generation cellular networks such as networked based on 3GPP Long Term Evolution (LTE), and IEEE 802.16m standards due to its effectiveness and flexibility in radio resource allocation.

OFDMA Resource Allocation

Time and frequencies in the radio spectrum are scarce resources in wireless communications, and therefore an efficient allocation is needed. The rapid growth of wireless applications and subscriber transceivers, i.e. mobile stations (MS), have require a good radio resource management (RRM) scheme that can increase the network capacity and reduce deployment costs. Consequently, developing an effective radio resource allocation scheme for OFDMA is of significant interest for wireless communication.

The fundamental challenge is to allocate the limited available spectrum in a large geographical for a large number of transceivers. Typically, the resources are allocated by base stations (BS). In other words, the same frequency spectrum can be used in multiple geographical areas or cells. This will inevitably cause inter-cell interference (ICI), when transceivers or mobile stations (MSs) in adjacent cells use the same spectrum. In fact, ICI has been shown to be the predominant performance-limiting factor for wireless cellular networks.

To maximize the spectral efficiency, a frequency reuse factor of one is used in OFDMA cell deployment, i.e., the same spectrum is reused by each BS and MS in each and every cell. Unfortunately, this high spectrum efficiency also unavoidably leads to ICI. Therefore, a good ICI management scheme is needed.

For a single cell, most of existing allocation methods optimize power or throughput under an assumption that each MS uses different subchannel(s) in order to avoid intra-cell interference. Another key assumption in single-cell resource allocation is that the BS has signal-to-noise ratios (SNR) for all channels. In a downlink (DL) channel from the BS to the MS, the SNR is normally estimated by the MS and fed back to the BS. In the uplink channel from MS to BS, the BS can estimate the SNR directly based on the signal received from the BS.

In a multi-cell scenario, the signal-to-interference-and-noise ratio (SINR) is difficult to obtain because the interference can come from multiple cells and depends on a variety of factors, such as distance, location, and occupied channel status of interferers, which are unknown before resource allocation. This results in mutual dependency of the ICI and complicates the resource allocation problem. Thus, a practical multi-cell resource allocation method that does not require global and perfect knowledge of SINR is desirable.

Inter-Cell Interference Coordination (ICIC)

ICIC is a technique that can effectively reduce ICI in regions of cells relatively far from the BS. ICIC is achieved by allocating disjoint channel resources to the MSs near the boundary of the cell that are associated with different cells. Because boundary MSs are most prone to high ICI, the overall ICI can be substantially reduced by coordination of channel allocation among boundary MSs. More specifically, the ICIC reduces ICI interference by allocating the same resource to MSs that geographically far apart MSs so that path loss due to the interference is reduced.

However, ICIC solely based on avoiding resource collision for boundary MSs only offers a limited performance gain for DL communications, because it does not consider interference caused by transmission from the BS to cell-center MSs.

Spatial Division Multiple Access (SDMA)

Space division multiple access (SDMA) provides multi-transceiver channel access by using multiple-input multiple-output (MIMO) techniques with precoding and multi-transceiver scheduling. SDMA exploits spatial information of the location of the MSs within the cell. With SDMA, the radiation patterns of the signals are adapted to obtain a highest gain in a particular direction. This is often called beam forming or beam steering. BSs that support SDMA transmit directed signals to multiple transceivers concurrently using the same resources. Thus, SDMA can increase network capacity.

Base Station Cooperation (BSC)

Base station cooperation (BSC) allows multiple BSs to transmit signals to multiple MSs concurrently while sharing the same resource, i.e., time and frequency. BSC utilizes the SDMA technique for the BSs to send signals to the MSs cooperatively, and is specifically used for boundary MSs that are within the transmission ranges of multiple BSs. In this case, the interfering signal becomes part of a useful signal. Thus, BSC has two advantages, spatial diversity and ICI reduction.

Diversity Set

Typically, each MS is 'registered' at and communicates with one BS, which is called the anchor or serving BS. However, in some scenarios such as handover, concurrent communication with multiple BSs can take place. A diversity set is defined in the IEEE 802.16e standard to serve this purpose. The diversity set keeps track of the anchor BS and adjacent BSs that are within the communication range of a MS. The information of the diversity set is also maintained and updated at the MS.

Graph-Based Framework

The channel assignment problem in conventional (non-OFDMA) cellular and mesh networks has been solved using a graph coloring approach. In the conventional problem formulation, each node in the graph corresponds to a BS or an access point (AP) in the network to which channels are allocated. The edge connecting two nodes represents the potential co-channel interference, which typically corresponds to the geographical proximity of the BSs. Then, the channel assignment problem that respects the interference constraints becomes the graph coloring problem, where nodes representing two interfering base stations should not have the same color, i.e., use the same channel.

In conventional networks, if two adjacent base stations transmit at the same time using the same spectrum, then they cause interference to each other in the MSs. Thus, in the conventional graph, all that is required is to ensure that adjacent nodes representing base stations have different colors. That solution is however inapplicable to OFDMA networks, where the frequency reuse factor is one, and all BSs do use the same spectrum. In addition, conventional graphs do not consider technologies such as ICIC and BSC, as described above.

SUMMARY OF THE INVENTION

The embodiments of the invention provide a method for allocating channels to mobile stations (MS) in an orthogonal frequency-division multiple access (OFDMA) cellular networks using a multigraph-based approach. As defined herein, a multigraph admits multiple edges between nodes The method maps the resource allocation problem to a multigraph coloring problem. This graph-based method differs fundamentally from the prior art in three aspects.

First, the prior art aims to minimize the number of subchannels in use under the interference constraint. The invention uses a fixed and predetermined number of subchannels. Because complete avoidance of interference is not physically possible, a proper and well administered compromise is described.

Second, nodes in the invented graph denote mobile stations, because channels are allocated to MSs in OFDMA networks. In the prior art, the nodes represent base stations. Furthermore, the location and movement of MSs changes the interference dynamics and consequently the graph.

Third, there can be multiple edges between nodes in the invented multigraph. The prior art graph of bases stations only has single edges between any two nodes.

A multigraph is constructed where nodes represent MSs and edges in the graph represent potential interference between the nodes connected by the edges. Multiple edges can be constructed for any pair of nodes considering both interference information and instantaneous channel state information (CSI). The interference information is obtained from the diversity set maintained at the BS for MSs. ICIC, BSC and SDMA techniques are all incorporated and no precise SINR information is required.

The multigraph is partitioned into non-overlapping clusters, to which channels are allocated. The partitioning accomplishes the interference management and channel assignment task concurrently.

An optimal solution to the partitioning problem is impractical. Therefore, suboptimal, heuristic methods are described.

DETAILED DESCRIPTION OF THE PREFERRED EMBODIMENT

Graph-Based OFDMA Resource Allocation

Figure 1:
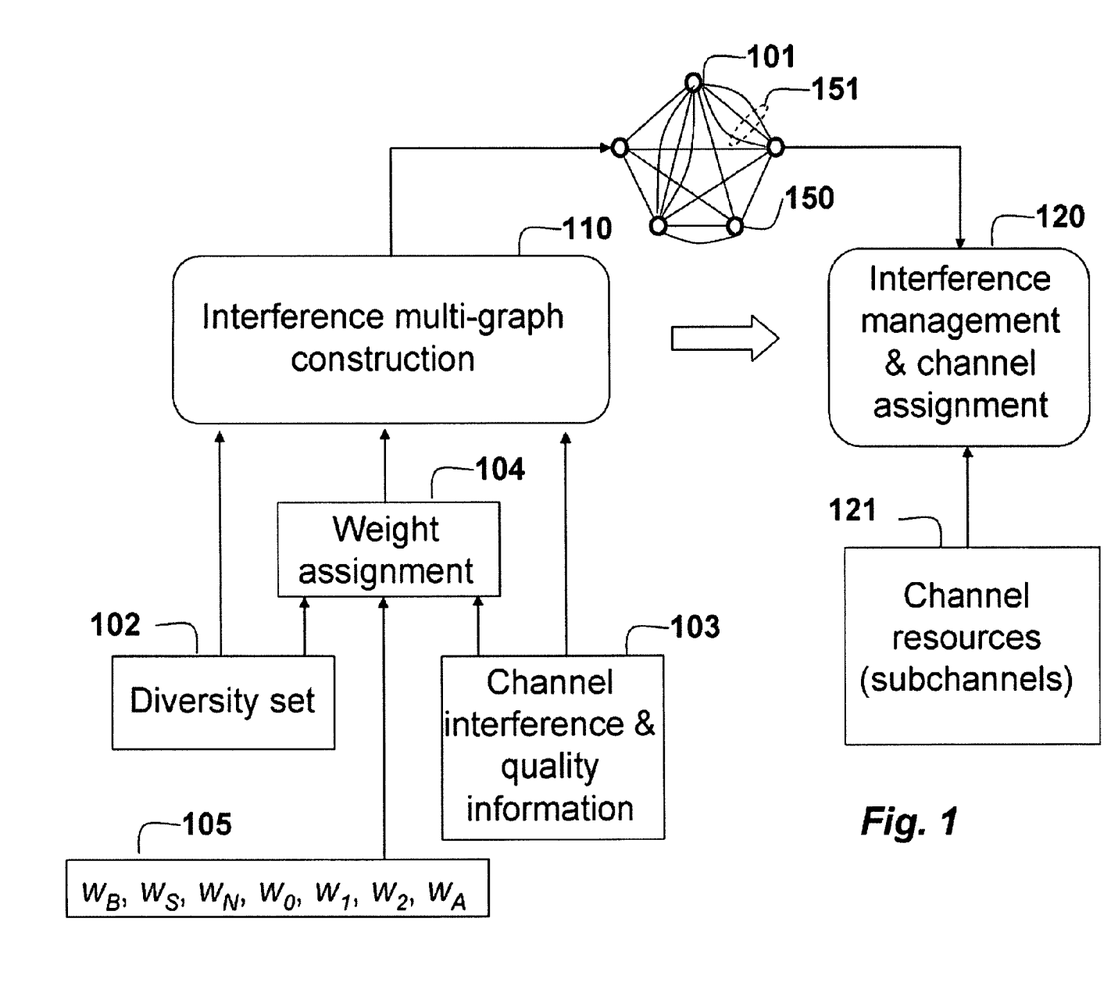
FIG. 1 is a flow chart of a method for allocating channel resources in an in orthogonal frequency-division multiple access (OFDMA) network according to embodiments of the invention.

FIG. 1 shows a multigraph-based orthogonal frequency-division multiplexing (OFDM) resource allocation method according to embodiments of the invention. The OFDMA network includes multiple base stations (BSs) and multiple mobile stations (MSs).

We construct 110 an interference multigraph 101. In the graph, nodes 150 represent the MSs, and edges 151 connecting the nodes represent potential interference between the mobile stations represented by the nodes connected by the edges, as well as a quality of the channels used by the mobile stations.

The graph is constructed using diversity sets 102 maintained by the BSs and the MSs in the OFDMA network. Each BS can maintain a diversity set for the set of MSs and has knowledge of all diversity sets served by the BS. The BSs can exchange the diversity sets so that all BSs have all diversity sets, and the MSs can maintain diversity sets for the base stations with which they are associated.

The potential interference at the MSs is based on the corresponding established diversity set. Channel quality information and interference information 103 are used with a weight assignment 104 to construct the edges in the interference graph, which represent the channel-dependent interference between MSs (nodes). The possible weights 105 are described in greater detail below.

Interference management and channel assignment 120 is performed using the multigraph 101 and channel resources 121. Heuristic methods are adopted to partition the graph into disjoint clusters, as well as to assign subchannels to clusters.

Spectrum Allocation

Figure 2A:
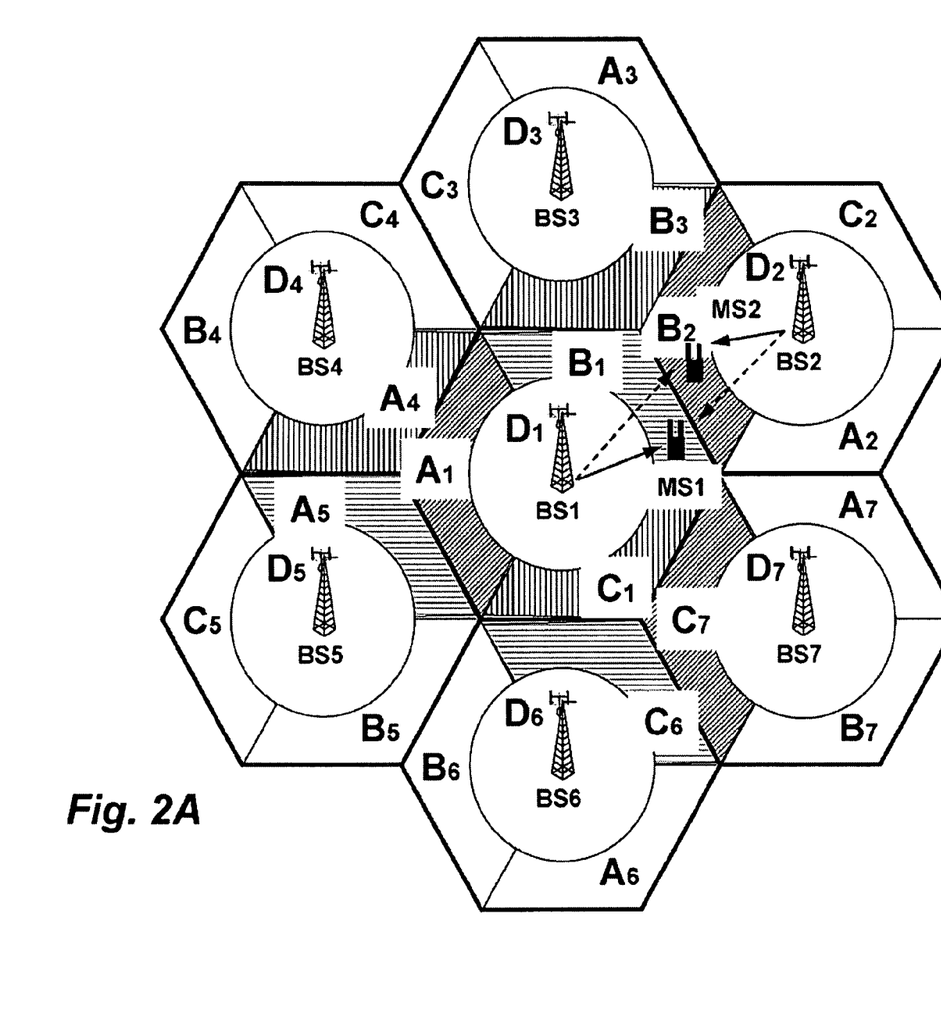
FIG. 2A is a schematic of an ICIC spectrum allocation implemented in adjacent cells and an exemplary ICIC scenario with 2 MSs and 2 BSs.
Figure 2B:
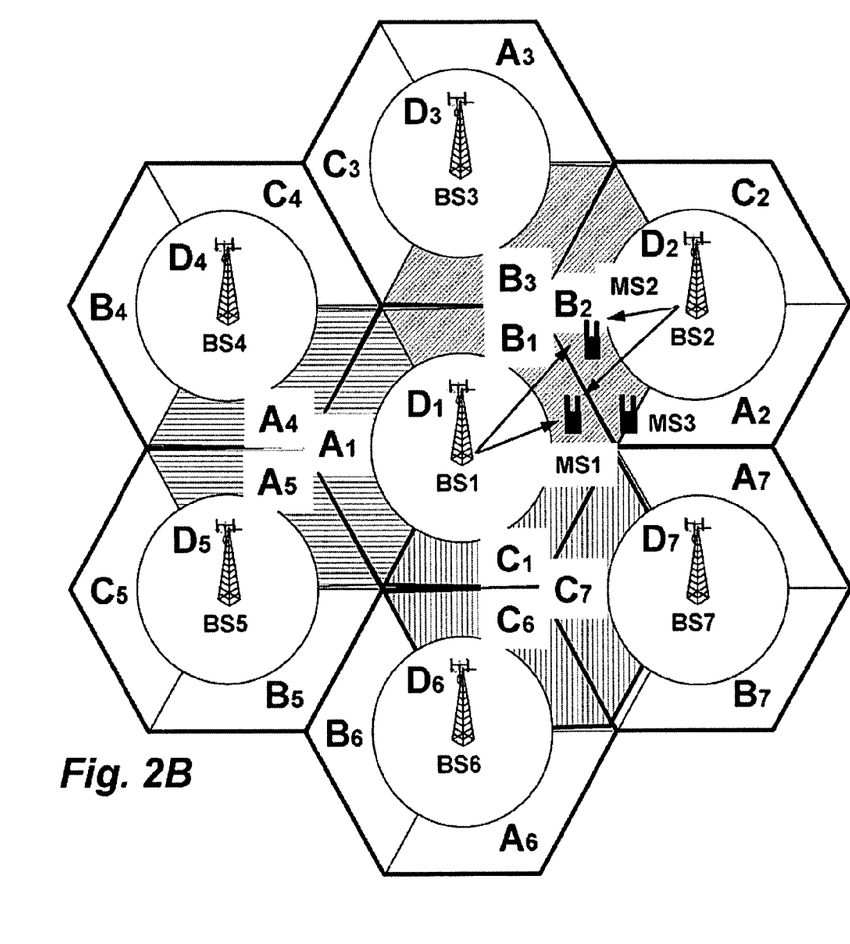
FIG. 2B is a schematic illustration of the BSC spectrum allocation implemented in adjacent cells and an exemplary BSC scenario with 2 MSs and 2 BSs.

FIGS. 2A-2B show spectrum allocation for OFDMA multi-cell networks described in the embodiments of our invention. Seven cells are shown. This can be easily generalized to more cells. The frequency reuse factor is one. That is, each cell uses the entire network bandwidth. Each cell is geographically partitioned into cell-center and boundary regions, with boundary region are further portioned into three sectors.

In FIGS. 2A and 2B, $A_i$, $B_i$ and $C_i$ refer to the three sectors in the boundary region respectively, and $D_i$ refers to the cell-center, i=1, . . . , 7. Note that the sectorization shown in FIGS. 2A and 2B serves only to illustrate the concept of resource allocation in terms of geographical regions and is not restrictive. In the Figures, channels in the sectors with the same shading share the same resources, e.g., frequency subchannels, and can therefore potentially interfere with each other.

Note that the cell center is farther from the adjacent cells and thus the transmission from BS to the cell center MSs cause less ICI to the MSs in adjacent cells. In contrast, the cell boundary is closer to the adjacent cells and thus the transmission from BS to the boundary MSs normally causes (and experience) stronger ICI to (from) MSs in the adjacent cells. In other words, resource allocation in boundary region should be more carefully administered so that ICI can be mitigated. This can be achieved by performing boundary planning in combination with interference management schemes such as ICIC or BSC.

ICIC Scenario

ICIC is achieved by allocating disjoint channel resources to boundary MSs that belong to different cells. This is shown in FIG. 2A by different shading patterns, where a non-overlapping spectrum is allocated to MS 1 and MS 2 located in adjacent $B_1$ and $B_2$ sectors, respectively. Therefore, the potential interference caused by downlink signal to each other, can be avoided. In general, ICIC suggests allocation of disjoint spectrum to channels in adjacent boundary regions (i.e., $A_1$, $A_4$ and $A_5$; $B_1$, $B_2$ and $B_3$; $C_1$, $C_6$ and $C_7$) to reduce interference.

BSC Scenario

BSC is achieved by allocating overlapping spectrum to MSs in adjacent boundary regions. As shown in FIG. 2B, overlapping spectrum is allocated to MS 1 and MS 2 located in adjacent $B_1$ and $B_2$ sectors, respectively. Then, BS 1 and BS 2 transmit signals jointly to both MS 1 and MS 2 in the same frequency band. Thus, the potential interference caused by downlink signal to each other is replaced by useful signals (shown by solid arrows). In general, BSC suggests allocation of overlapping spectrum to adjacent boundary regions (i.e., $A_1$, $A_4$ and $A_5$; $B_1$, $B_2$ and $B_3$; $C_1$, $C_6$ and $C_7$) to allow cooperation, as shown in FIG. 2B. This would never be possible in conventional networks.

BSC can be integrated with intra-cell SDMA, which allows a BS to transmit to its multiple serving MSs using the same OFDMA resource. For instance, FIG. 2B shows that if BS2 communicates with MS 2 and MS 3 using SDMA, MS 1, MS 2 and MS 3 can participate in a 3-MS, 2-BS BSC scenario.

In the following, we describe our multigraph-based resource allocation method for OFDMA-based multi-cell networks. Note that the method allows the use of both ICIC and BSC management schemes concurrently.

Interference Multigraph

Figure 3:
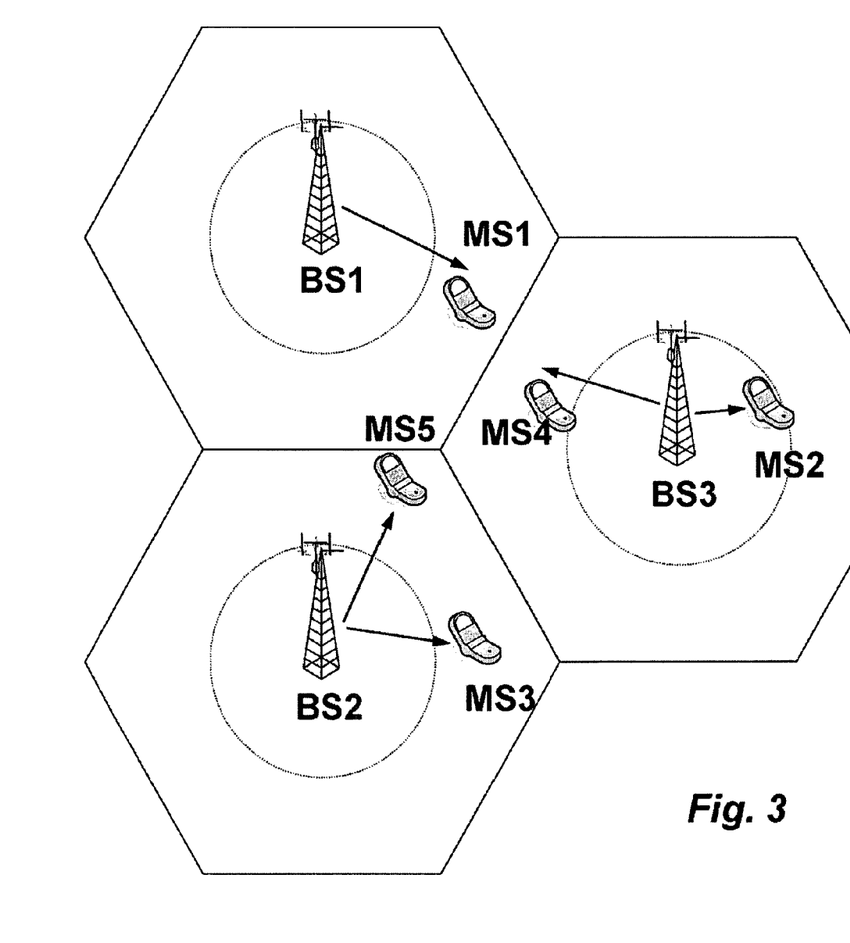
FIG. 3 is a schematic of a multi-cell network.

FIG. 3 shows an example arrangement of BSs and MSs. We want to determine a strength of interference from the geographic locations of the MSs, along with the instantaneous channel state information (CSI), which is indicative of the channel quality. We use this information to construct the corresponding interference multigraph 101 as shown in greater detail in FIG. 4.

Figure 4:
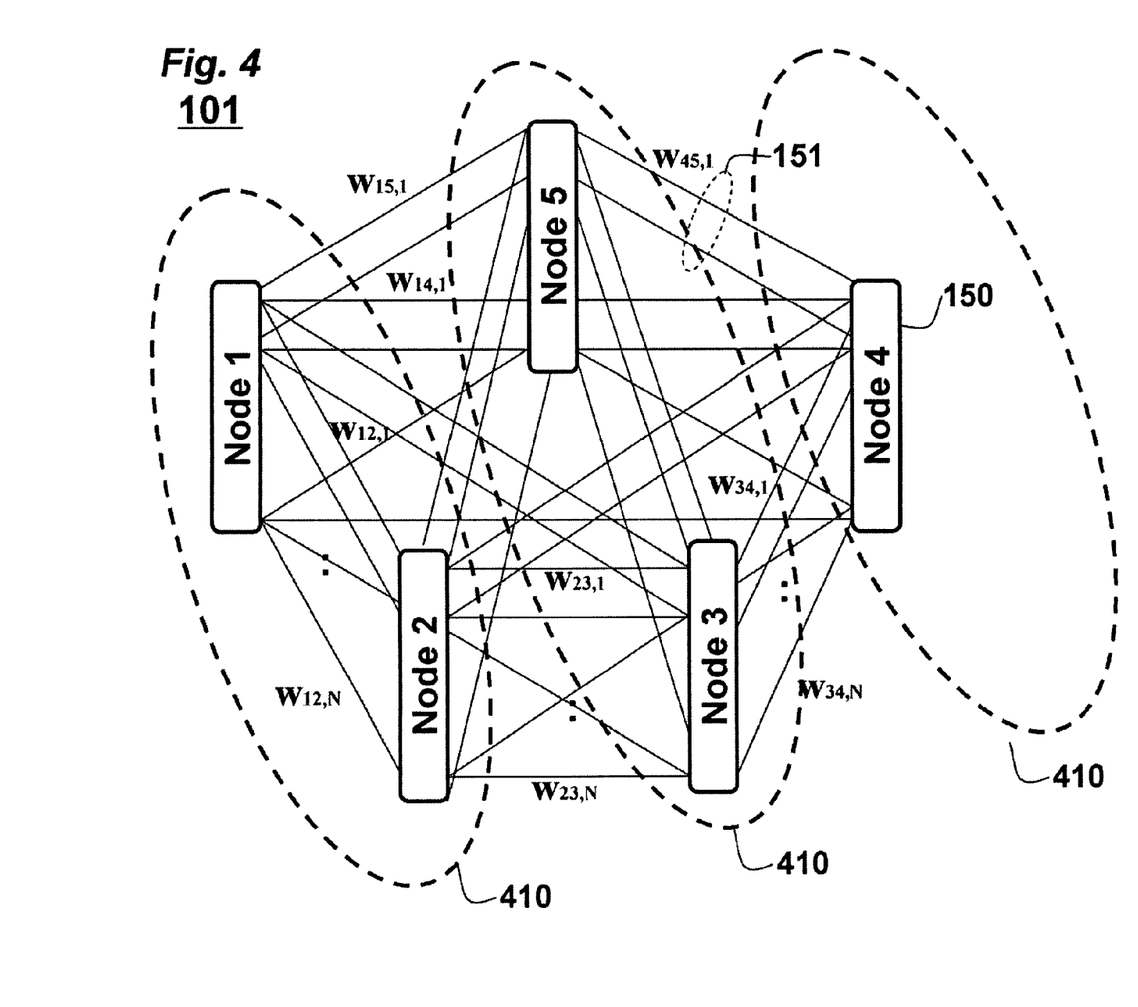
FIG. 4 is an interference multigraph constructed for a multi-cell multi-transceiver scenario according to an embodiment of the invention.

In FIG. 4, each node I, for =1, . . . , 5, represents an MS. All pairs of nodes are connected by N parallel edges, if assuming there are N pieces of OFDMA resources, e.g., subchannels, in the network. Each of the N parallel edges has an associated "cost" or weight w which represents the potential interference between two MSs in a given subchannel and the channel quality for the channel. For example, the weight between node a and node b, a<b, in subchannel n is denoted by $w_{ab,n}$ in FIG. 4.

The weight $w_{ab,n}$ is affected by two factors, interference $w_{ab}$ and instantaneous channel quality that can be measured as a signal strength $f_{ab,n}$ $$w_{ab,n} = w_{ab} * f_{ab,n}. \qquad (1)$$

The weight $w_{ab}$ represents the potential interference between MSs a and b, if both MSs are allocated the same OFDMA resource. The signal strength $f_{ab,n}$ represents the instantaneous CSI f MSs a and b in subchannel n, including the effect of frequency-selective fading. The higher the value of the weight $w_{ab}$, the higher the potential interference between MSs a and b, if they use the same OFDMA resource. The higher the value of the signal strength $f_{ab,n}$, the worse the instantaneous channel quality in subchannel n for MS a and b. Therefore, the channel quality contribution to the weight is inversely proportional.

We see a close relationship between the well known max k-cut and its dual, min k-partition problem in general graph theory, and the channel assignment problem in OFDMA networks that takes interference management into consideration. In graph theory, a cut is a partition of the vertices of the graph into multiple sets or clusters. The size of a cut is the total number of edges crossing the cut. In our weighted graphs, the size of the cut is the sum of weights of the edges crossing the cut.

A cut is maximal (max) if the size of the cut is not smaller than the size of any other cut. By generalizing a cut to k cuts, the max k-cut problem is to find a set of k cuts that is not smaller in size than any other k cuts. Its dual, min k-partition problem, on the contrary, is to find a set of k cuts that achieves clustering that has the smallest sum of intra-cluster edge weights. Both are NP-complete problems for a graph with a large number of nodes. Consequently, we use a heuristic method that can efficiently produce an approximate solution. Thus, given N subchannels and M MSs, a good solution for the channel assignment problem is solved by the min k-partition problem.

The goal of the min k-partition problem is to partition the interference multigraph in FIG. 4 into clusters 410, so that a sum of the intra-cluster edge weight is minimized. Each cluster 410 is further allocated resource, e.g., subchannels. Nodes, i.e., MSs, in the same cluster are allocated the same subchannel. To minimizing the intra-cluster edge weights, the result tends to place strong interferers (associated with high weight) into different clusters as well as assign better subchannel (associated with low weight) to a cluster. This achieves our optimal channel assignment with effective interference management.

In the following, we describe the method for determining the channel-dependent weight in FIG. 4, comprising two parts:

1) interference-related part of the weight; and 2) the combined interference-and-signal-related weight.

Interference-Related Weight Construction for the Interference Multigraph

The embodiments of the invention provide a method to construct the interference-related part of the weight, $w_{ab}$, without accurate SINR measurements because the acquisition of related SINR measurement prior to the channel assignment is difficult, if feasible at all, in practice. The basic idea is to determine the weight associated with edge (a,b) based upon the diversity set information 102 maintained at base station (BS) for MSs a and b.

Figure 5:
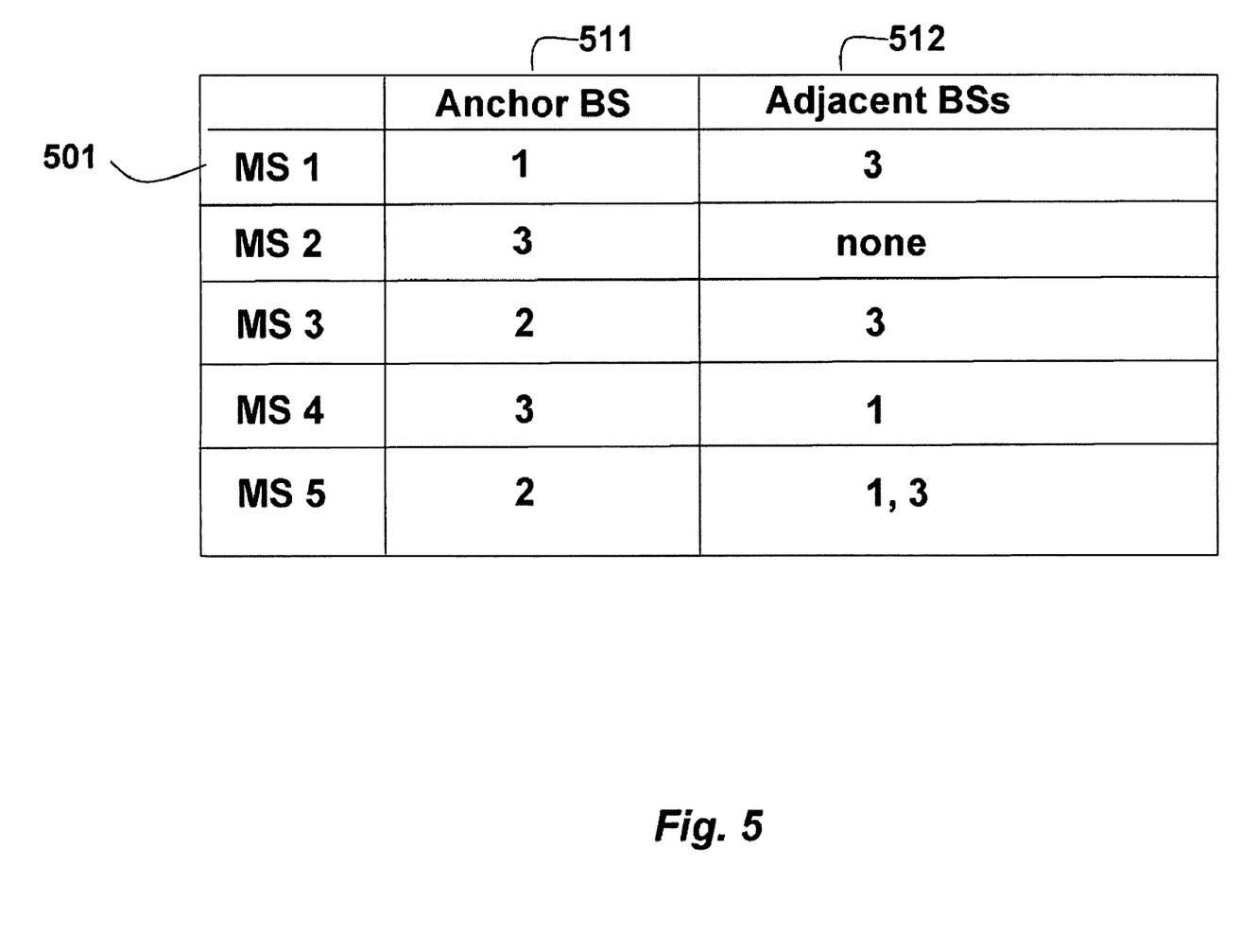
FIG. 5 is a table of a diversity set according to an embodiment of the invention.

FIG. 5 shows the diversity set for the example shown in FIG. 3. In FIG. 5, each row 501 indicates the diversity set maintained at the BS for the corresponding MS. Each MS has an anchor BS 511, and possibly several adjacent BSs 512, if the MS is located near the cell boundary. The diversity set contains useful geographical information that is related to interference between MSs. The geographical information represents a topology or "structure" of the network. Hence, this structure is reflected in the multi graph.

In addition, we can determine the potential interference between any two MSs from the diversity set as described below. Hence, the potential interference is also represented in the multigraph by the edges, along with the channel quality.

MS 2 and MS 4 are in the same cell and have the same anchor BS. Therefore, if they are allocated the same OFDMA resource (e.g., subchannel), they cause intra-cell interference to each other unless they perform SDMA.

The anchor BS of MS 1 is in the adjacent BS set of MS 4. Similarly, the anchor BS of MS 4 is in the adjacent BS set of MS 1. This implies that MS 1 and MS 4 potentially cause interference to each other, if they are allocated with the same OFDMA resource (e.g., subchannel). For the same reason, MS 1 and MS 4 are capable of performing BSC. Thus, we can conclude that MS 1 and MS 4 have ICI with each other unless they perform BSC.

The anchor BS of MS 4 is in the adjacent BS set of MS 3. Thus, MS 4 and MS 3 cause interference to each other if they use the same OFDMA resource (e.g., subchannel). However, because the anchor BS of MS 3 is not in the adjacent BS set of MS 4, MS 3 and MS 4 cannot perform BSC. MS 1 and MS 3 do not interfere with each other, as the anchor BS of neither MS is in the adjacent BS set of the other MS.

The above analysis is performed for every pair of nodes followed by a weight assignment. In one embodiment, there are seven possible weight values 105 that can be selected for edges between any two nodes, $w_B, w_S, w_N, w_0, w_1, w_2, w_A,$ where the weights $w_B, w_S, w_N$ and $w_A$ correspond to weights associated with BSC, SDMA, no-interference, and intra-cell interference, respectively, and $w_0, w_1, w_2$ are ICI weights at various interference levels depending on the geographic location of the two MSs.

That is, the mutual ICI between two MSs located in two different cells is the weakest if each MS is in the center (denoted by $w_0$) of its own cell, medium if one MS is at the boundary of one cell and the other in the center of the other cell (denoted by $w_1$), and strongest if both MSs are on the boundary of its own cell (denoted by $w_2$).

Overall, the seven weight values can be ranked as $w_B \approx w_S \ll w_N < w_0 < w_1 < w_2 \ll w_A.$ Note that $w_B$ and $w_S$ are the smallest because they require that the MSs use the same subchannel, and $w_A$ is the largest because we would like to completely avoid the intra-cell interference.

Figure 6:
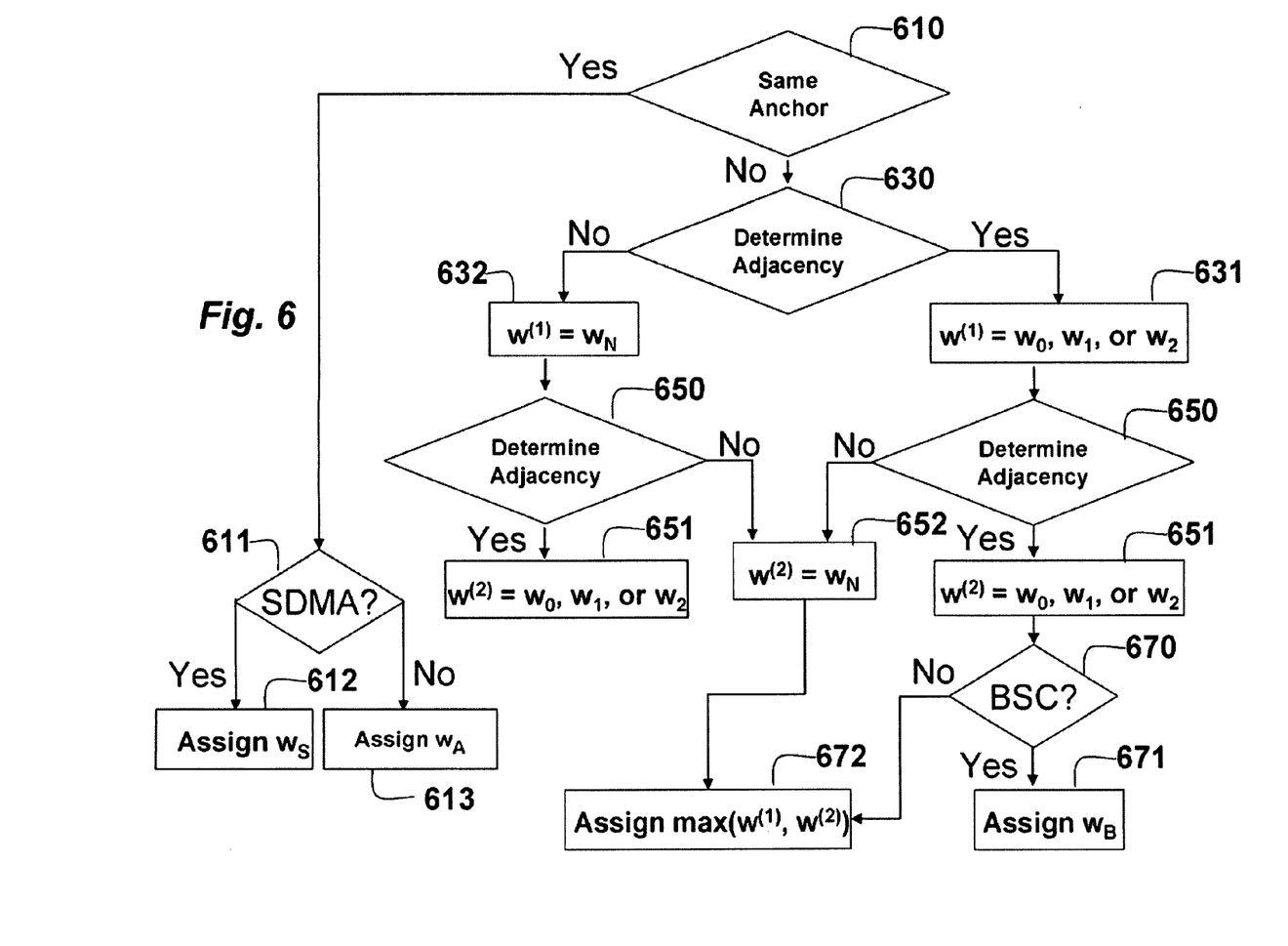
FIG. 6 is a flow chart of the method to determine the interference-related edge weight in FIG. 4 according to an embodiment of the invention.

The complete method to determine the interference-aware edge weight is summarized by the flow chart in FIG. 6.

First, the anchor BS of MS a and MS b are checked 610. If they are the same, the weight decision can be made directly. We determine 611 if SDMA is used and assign $w_{ab}$ as $w_S$ 612 or $w_A$ 613 accordingly.

If they are not the same, then further procedures are needed. Specifically, anchor BS of MS a is checked 630 whether it is in MS b's adjacent BS diversity sets, and temporary weight ($w_0, w_1, w_2$) 631 or $w_N$ 632 is assigned accordingly. Likewise, anchor BS of MS b is checked 650 whether it is in MS a's adjacent BS diversity sets, and temporary weight ($w_0, w_1, w_2$) 651 or $w_N$ 652 is assigned accordingly. If both anchor BSs are in each other's adjacent BS set, then BSC is qualified and is determined 670 to be used or not. If BSC is used, assign $w_B$ 671; otherwise, assign max($w^{(1)}, w^{(2)}$) 672.

Figure 7:
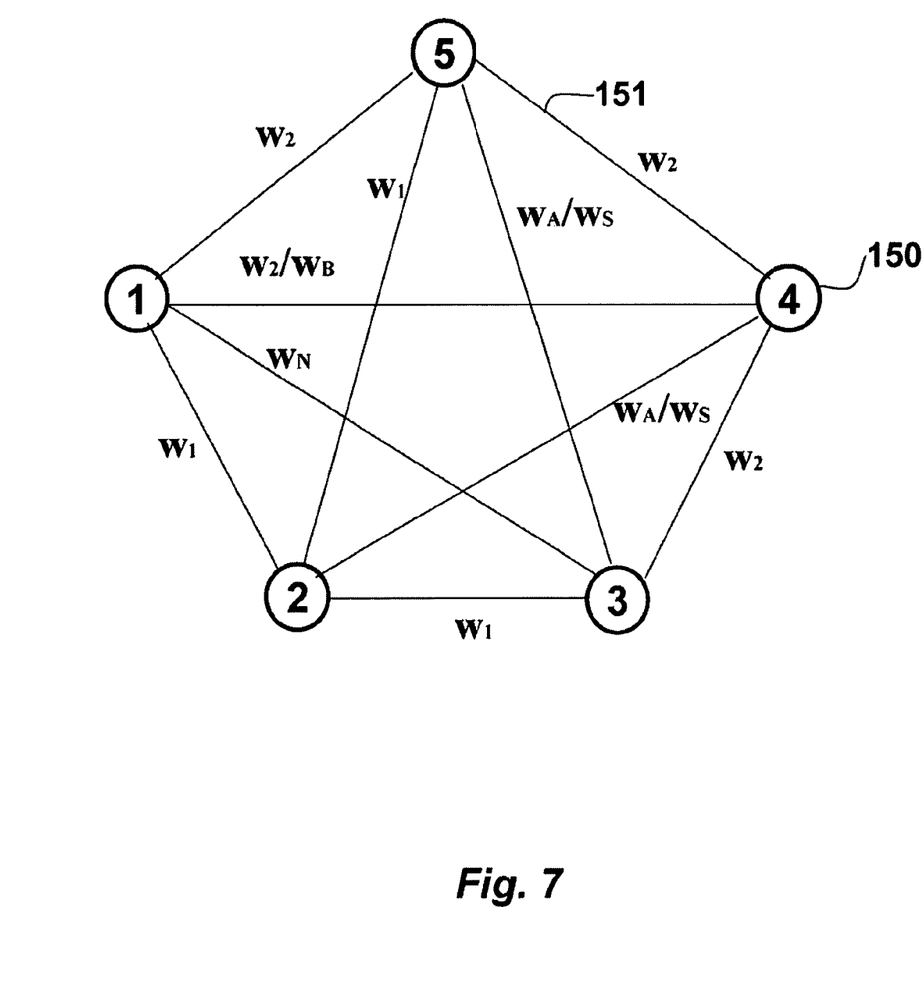
FIG. 7 is an interference graph with interference-related edge weights assigned according to the method in FIG. 6 according to an embodiment of the invention.

The resulting interference-related weight for FIG. 3 is illustrated in FIG. 7 for nodes 1-5, where some edges 151 contain multiple possible weights depending on the actual configuration of MSs. For example, MS 1 and MS 4 can perform ICIC (with weight $w_3$) or BSC (with weight $w_B$). MS 2 and MS 4 (or MS 3 and MS 5) can adopt SDMA (with weight $w_S$) or not (with weight $w_A$). For other pairs of nodes with ICI, we use ICIC. Note that BSC and SDMA are optional functionality, which can be incorporated when this is feasible.

For one embodiment, the interference-related edge weights are $(w_B, w_S, w_N, w_0, w_1, w_2, w_A) = (-10^3, -10^3 + 50, 0, 50, 100, 200, 10^5).$ A small change in the weight does not change the result. Note that graph edge weight different from the ones described above can also be used.

Combined Interference-Related and Signal-Related Weight for the Interference Multigraph The embodiments of the invention provide a method to construct the combined interference-related and signal-related weight, $w_{ab,n}$. The objective is to properly incorporate the signal-related weight in the interference-related weight previously established. The signal-related part, $f_{ab,n}$, at minimum follows the rule that the worse the instantaneous CSI in subchannel n for MSs a and b, the higher the value of signal strength $f_{ab,n}$.

We define $w_{ab,n}$, for $w_{ab} \in \{w_N, w_0, w_1, w_2, w_A\}$, $$w_{ab,n} = w_{ab} * f_{ab,n}$$
$$= w_{ab} \times [1 + 2^{(-h_{an} h_{bn})}].$$

for $w_{ab} \in \{w_B, w_S\}$ $$w_{ab,n} = w_{ab} * f_{ab,n}$$
$$= w_{ab} \times [1 - 2^{-(h_{an} h_{bn} + 1)}],$$

where $h_{an}$ and $h_{bn}$ are the instantaneous channel gain in subchannel n for MSs a and b, respectively, and are of non-negative values. Note that the signal strength $f_{ab,n}$ is adjusted according to the sign of the value of $w_{ab}$, so that when either $h_{an}$ or $h_{bn}$ is small, meaning the instantaneous quality of the channel is bad, the weight value of $w_{ab,n}$ is relatively large. Hence, the weight is inversely proportional to the channel quality.

Figure 8:
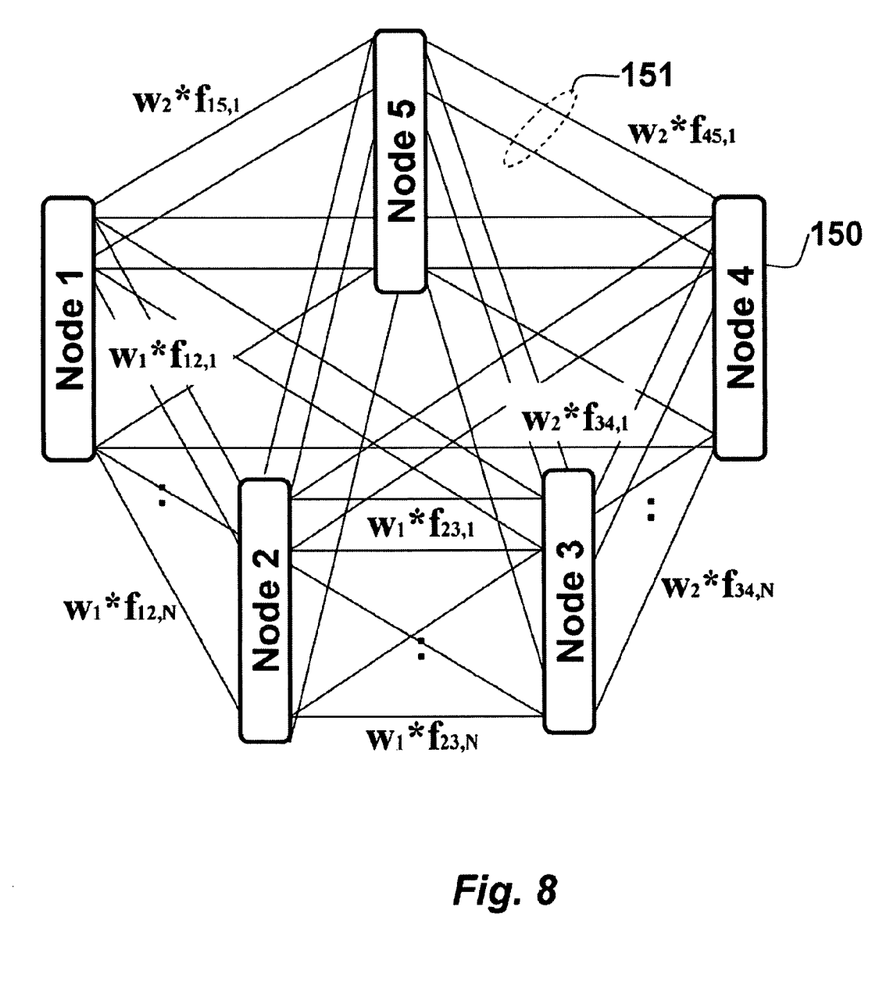
FIG. 8 is an interference multigraph with assigned interference-related and signal-related edge weights according to an embodiment of the invention.

FIG. 8 shows the resulting multigraph with the combined interference-related and signal-related weight.

Method for Solving the Multigraph Coloring Problem

The optimal solution for the min k-partition problem is computationally prohibitive for large graphs, i.e., a large number of MSs. Thus, a suboptimal heuristic method is used to solve it.

Figure 9:
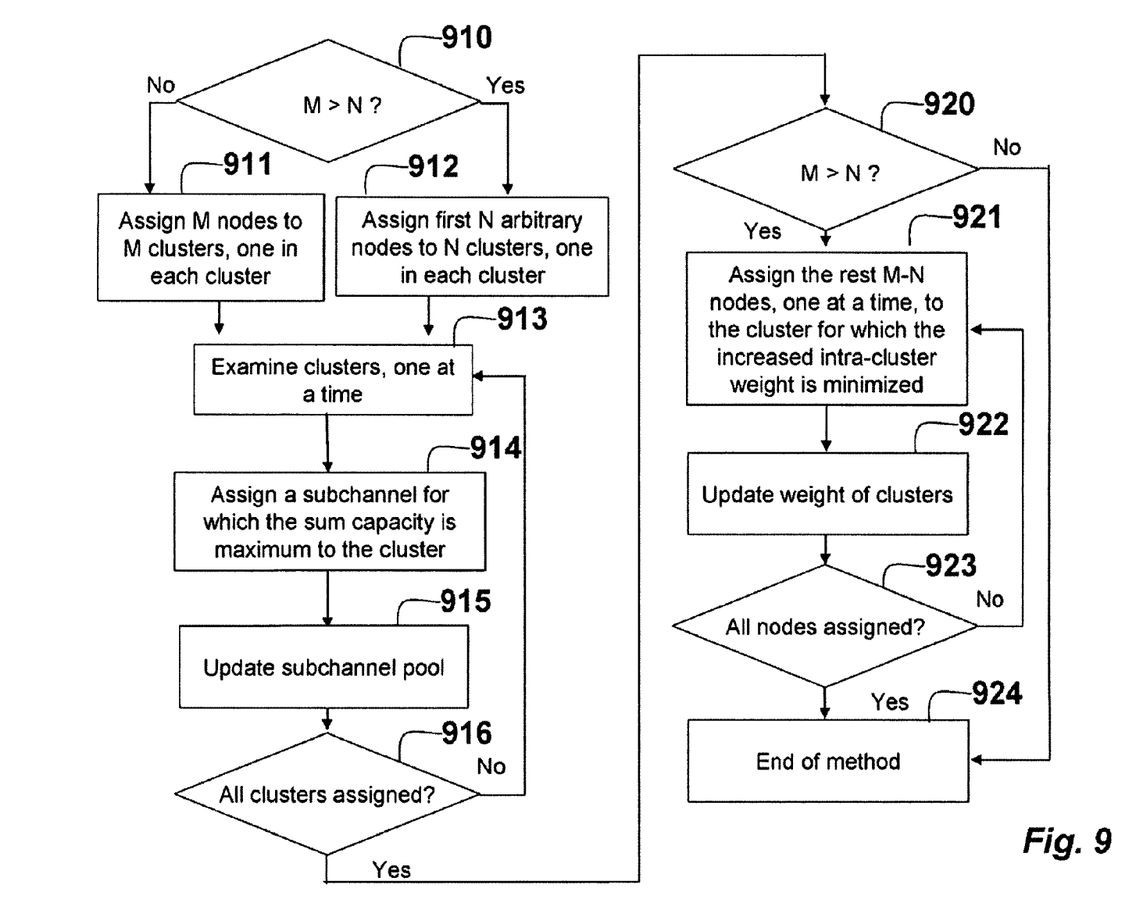
FIG. 9 is a flow chart of the method to solve the channel assignment according to an embodiment of the invention.

FIG. 9 shows the heuristic method. Our objective here is that, given N subchannels and M MSs, find a partition of the interference multigraph into N clusters, and associate a subchannel to each cluster, so that the intra-cluster edge weight is minimized.

The method begins with checking 910 whether M>N. If M≦N, the clustering problem becomes trivial and the remaining task is to assign M nodes to M clusters 911 followed by channel assignment. If M>N, the method first assigns N arbitrary nodes to N clusters, one in each cluster 912.

Then, clusters (either M or N clusters for case of M≦N or M>N) are examined 913 in an arbitrary order, one at a time. For each particular cluster, the subchannel for which the capacity of using this subchannel is maximum for this cluster is assigned to this cluster 914.

After the assignment, the subchannel pool is updated 915, with the subchannels that have already been allocated removed from the available resource pool. The same procedure is then applied on the next cluster until all clusters have been assigned a subchannel 916.

It is checked again whether M>N 920. If M≦N, by now the entire process of interference management plus channel assignment is complete 924.

If M>N, the rest of M−N nodes are iteratively assigned at each step to the cluster for which the increased intra-cluster weight is minimized 921. The intra-cluster weight is channel-dependent as each cluster is now associated with a subchannel. After the new assignment is done, the intra-cluster weight of the cluster is updated 922. The algorithm continues on the next node until all nodes are assigned into a cluster 923, when the method ends 924.

Performance Evaluation

Figure 10:
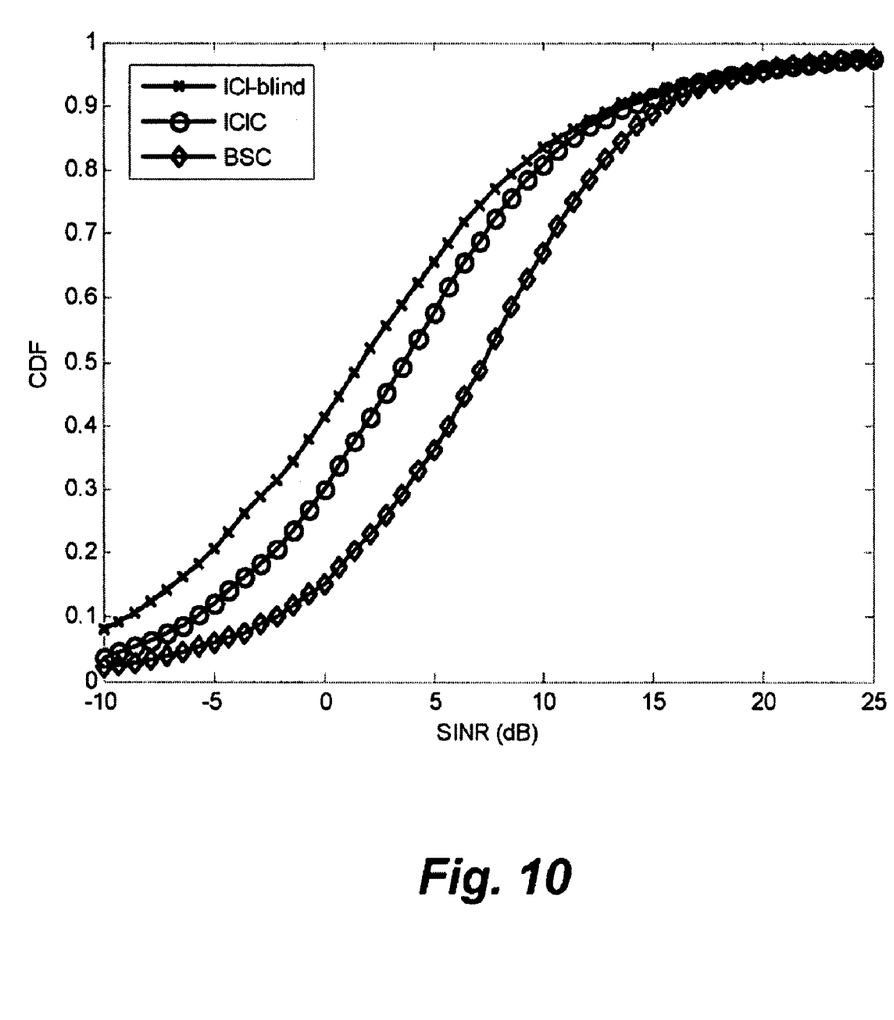
FIG. 10 are graphs comparing conventional and invented allocation methods.

FIG. 10 compares the conventional ICI-blind allocation, with our proposed methods, which differ in the ICI management mechanism (ICIC or ICIC+BSC). That is, the BSC scheme incorporates the BSC weight, $w_B$, in the interference multigraph whenever this is feasible, while the ICI scheme does not. The graphs show the cumulative distribution function (CDF) versus SINR for the three test schemes. The methods according to the invention have a remarkable improvement on the SINR performance compared to the conventional ICI-blind method. This demonstrates the effectiveness of proposed interference management and channel assignment methods.

It is to be understood that various other adaptations and modifications can be made within the spirit and scope of the invention. Therefore, it is the object of the appended claims to cover all such variations and modifications as come within the true spirit and scope of the invention.

We claim:

1. A method for allocating channel resources in an orthogonal frequency-division multiple access network including a set of base stations and a set of mobile stations for each base station, comprising the steps of:

constructing a multigraph, in which nodes in the multigraph represent mobile stations in the orthogonal frequency-division multiple access network, and each edge between a pair of nodes represents a potential interference and a channel quality for channels used by the mobile stations represented by the pair of nodes;

assigning a weight to each edge, in which the weight is proportional to the potential interference, and inversely proportional to the channel quality of the channels, in which the weight is selected from $w_B$, $w_S$, $w_N$, $w_0$, $w_1$, $w_2$, $w_A$, where the weights $w_B$, $w_S$, $w_N$, and $w_A$ correspond to weights associated with base station cooperation, space division multiple access, no-interference, and intra-cell interference, respectively, and $w_0$, $w_1$, $w_2$, are inter channel interference at various interference levels depending on geographic locations of the mobile stations represented by the nodes, in which the weights are ranked as $w_B \approx w_S \ll w_N < w_0 < w_1 < w_2 \ll w_A$; and allocating channel resources to the mobile stations based on a structure of the multigraph, the potential interference and the channel quality.

2. The method of claim 1, further comprising:

maintaining a diversity set for each mobile station, in which the diversity set indicates an anchor base station for the mobile station and any adjacent base stations, and in which the structure of the multigraph and the potential interference is based on the diversity sets.

3. The method of claim 2, further comprising:

determining, at each base station based on the diversity sets, whether a set of mobile stations served by the base station can perform space division multiple access;

determining, at each base station based upon the diversity sets, whether the set of mobile stations served by the base station can perform base station cooperation;

determining, at each base station based on information in the diversity set, whether the set of mobile stations served by the base station cause inter-cell interference in the set of mobile stations served by the adjacent base station; and determining, at each base station, whether the mobile stations served by the base station causes intra-cell interference within the set of mobile stations served by the base station.

4. The method of claim 3, further comprising:

assigning a unique edge weight associated with every subchannel in the multigraph for interference caused by intra-cell interference;

assigning a unique edge weight associated with every subchannel in the multigraph for interference caused by inter-cell interference;

assigning a unique edge weight associated with every subchannel in the multigraph for interference caused by space division multiple access; and assigning a unique edge weight associated with every subchannel in the multigraph for interference caused by base station cooperation.

5. The method of claim 1, in which a frequency reuse factor of the orthogonal frequency-division multiple access network is one.

6. The method of claim 1, in which the channel resources are allocated according to inter-cell interference coordination, and in which the allocated channel resources are disjoint.

7. The method of claim 1, in which the channel resources are allocated according to base station cooperation, and in which the allocated channel resources are shared.

8. The method of claim 7, in which the base station cooperation uses space division multiple access.

9. The method of claim 1, in which a weight $w_{ab,n}$ on an edge between node a and node b is $$w_{ab,n} = w_{ab} * f_{ab,n},$$

where $w_{ab}$ is the potential interference, and $f_{ab,n}$ is dependent on an instantaneous signal strength $f_{ab,n}$, and the signal strength in inversely proportional to the channel quality.

10. The method of claim 1, further comprising:

partitioning the nodes in the graph into clusters such that a total weight of the edges in each cluster is minimized.

11. The method of claim 10, in which the partitioning uses a min k-partition process.

12. The method of claim 1, in which the same channel resources are assigned to all mobile stations represented by the nodes in a particular cluster.

13. The method of claim 1, in which the weight are selected from $w_B$, $w_S$, $w_N$, $w_0$, $w_1$, $w_2$, $w_A$, and in which defining $w_{ab,n}$, for $w_{ab} \in \{w_N, w_0, w_1, w_2, w_A\}$, $$w_{ab,n} = w_{ab} * f_{ab,n}$$
$$= w_{ab} \times [1 + 2^{(-h_{an}h_{bn})}],$$

for $w_{ab} \in \{w_B, w_S\}$ $$w_{ab,n} = w_{ab} * f_{ab,n}$$
$$= w_{ab} \times [1 - 2^{-(h_{an}h_{bn}+1)}],$$

where $h_{an}$ and $h_{bn}$ are instantaneous channel gains in subchannel n for node a and b, respectively.

14. The method of claim 1, further comprising:

exchanging diversity sets among all adjacent base stations in the orthogonal frequency-division multiple access network.

* * * * *